United States Patent [19]
Ross

[11] Patent Number: 5,256,024
[45] Date of Patent: Oct. 26, 1993

[54] TILTABLE FLATBED TRAILER IMPROVEMENT FOR SIDE-BY-SIDE COUPLING

[76] Inventor: Ronald A. Ross, Box 138, Needhamville Rd., Fort Ann, N.Y. 12827

[21] Appl. No.: 841,341

[22] Filed: Feb. 25, 1992

[51] Int. Cl.$^5$ ............................................. B60P 1/28
[52] U.S. Cl. ........................... 414/483; 414/482; 414/480; 280/656; 280/638; 280/789; 298/5; 298/8 R
[58] Field of Search ............... 414/469, 482, 483, 485, 414/480, 476, 477; 280/638, 656, 789, 409; 298/8 R, 8 T, 5, 6

[56] References Cited

U.S. PATENT DOCUMENTS

| | | | |
|---|---|---|---|
| 2,955,833 | 10/1960 | Hyland et al. | 280/656 |
| 3,885,690 | 5/1975 | Van Slambrouck . | |
| 4,051,967 | 10/1977 | Sedgwick et al. | 414/483 |
| 4,222,698 | 9/1980 | Boelter | 414/477 |
| 4,763,915 | 8/1988 | Risser | 280/656 X |
| 5,016,896 | 5/1991 | Shafer | 280/400 |
| 5,059,085 | 10/1991 | Koller | 414/482 |

FOREIGN PATENT DOCUMENTS

| | | | |
|---|---|---|---|
| 971515 | 7/1975 | Canada | 414/480 |
| 24205 | 12/1956 | Fed. Rep. of Germany | 280/638 |

*Primary Examiner*—Frank E. Werner
*Attorney, Agent, or Firm*—Schmeiser, Morelle & Watts

[57] ABSTRACT

A pair of tiltable, flatbed sport vehicle transport trailers coupled in side-by-side arrangement. The invention is a modification which employs a common drawage hitch, for coupling thereto a pair of trailer drawbars, an axle extender for coupling the hubs of the side-by-side arranged trailers to form a common axle and an optional modification of each trailer drawbar fixing mounts that allows the drawbars of the individual trailers to be canted, that is obliquely postured so that the centerlines of the drawbars will then converge at a common point, to which is proximately fixed the common drawage hitch. Thereafter, a towing vehicle will be coupled to the common drawage hitch and the side-by-side pair of trailers drawn as a single unit.

1 Claim, 2 Drawing Sheets

TILTABLE FLATBED TRAILER IMPROVEMENT FOR SIDE-BY-SIDE COUPLING

BACKGROUND OF THE INVENTION

1. Field of the Invention

The instant invention relates generally to towable flatbed trailers which are used, for example, in the towing of snowmobiles, all-terrain vehicles and the like. More specifically, it discloses novel improvements to a tiltable flatbed trailer which allows two of the invention articles to be axially coupled in a side-by-side arrangement and to be towed or drawn in that configuration by a towing mechanism via a common hitching or drawing point that lies on the center line passing between two of the (invention) trailers, central of their common axle.

2. Discussion of the Relevant Art

For many years, users of motorized sleds, snowmobiles, all-terrain vehicles and similar vehicles have had the requirement to transport these generally recreational vehicles from the site of storage to the site of usage. To accomplish the aforesaid transport function, practically all such vehicle users employ flatbed trailers or the like. In recent years, the common, single, vehicle flatbed trailer has evolved from the short, narrow type to the long-bed, articulating-bed and/or tilting-bed trailer. Further, where some transporters have had reason or cause to place the aforesaid vehicles in side-by-side arrangement, the transporting flatbeds have been considerably widened. Most of the aforesaid modifications, however, have been had at a greater expenditure of materials, mechanical innovation and, of course, money. However, I have now developed a unique improvement to the relatively short and narrow tiltable flatbed trailer which provides a fresh approach to solving the transport problem faced by an owner of a growing sport vehicle fleet who may be required to "size down" a particular trailer assembly once he/she is off major highways onto narrowly restricted passages. Briefly, I acquire this facility by constructing a trailer of the tiltable flatbed type which can be readily coupled in a side-by-side arrangement with another of its kind or quickly detached from such side-by-side configuration and hitched in a conventional tandem arrangement, thereby giving the towing vehicle-trailer ensemble a connective arrangement with at least two points of articulation.

There is an abundance of art, located in the United States Patent Office files, which relates to snowmobile and similar vehicle trailers of the double-bed type. One such trailer is disclosed in a patent issued to Shafer in May 1991, U.S. Pat. No. 5,016,896, for a DOUBLE-BED TRAILER. Shafer teaches a double-bed snowmobile trailer that includes an axle assembly, trailer support wheels rotatably mounted to the axle assembly, to rotate about the common axle axis, a pair of trailer beds each mounted to the axle assembly so as to pivot independently of the other about the common axle axis, a single drawbar pivotally connected with respect to the middle of the axle assembly and extending forwardly in a normal relationship to a vertical plane that includes the common axle axis, and finally a hitch for releasably fastening each of the independently tiltable trailer beds to the drawbar in order to prevent rotation of a trailer bed with respect to the drawbar when the entire ensemble is conformed to its in-transit position. Although highly functional, in providing a side-by-side snowmobile transport arrangement, this apparatus nonetheless suffers from the one disadvantage that I have eliminated—both beds of the trailer share a common axle and, thus, the trailer cannot be sized down in order to effect passage along a narrow roadbed or a narrow trail. The Shafer trailer is so large that it necessitates disembarkation of the sport vehicles at any point beyond which the trailer cannot pass. Most notable in the Shafer disclosure is the fact that his primary concern is with creating a trailer mechanism that, in addition to tilting backward to receive the sport vehicle, is also capable of tilting forward so as to (motively) release the sport vehicle. I am not concerned with this facility, even though it preoccupies a great deal of present-day concern, because to do so would necessitate a great deal of additional mechanical structure in order to maintain the spirit of the instant invention. Two other patents, U.S. Pat. No. 3,885,690 issued to Van Slambrouck for a TRAILER FOR SNOWMOBILES and U.S. Pat. No. 4,222,698, issued to Boelter for a TRAILER ASSEMBLY FOR SNOWMOBILES, will now be discussed briefly for their respective teachings of a wide ted trailer using a common axle, which transports snowmobiles in both side-by-side and tandem positions, and a single, narrow bed trailer having two or more axles adapted for carrying snowmobiles in both side-by-side and tandem position. Both the Van Slambrouck and Boelter patents disclose essentially flatbed trailers which have a portion thereof which tilts downward to receive thereonboard the various sport vehicles.

In became quite apparent to me that none of the art which I was able to discover in either the records of the United States Patent Office or the various trailer manufacturers was suitable for the purposes that I had in mind. Briefly, I required a trailer capable of handling at least one snowmobile type of vehicle placed side-by-side relationship so that I could transport a pair or more without undue difficulty. More importantly, when I desired to transport a single snowmobile, or transport one along a very narrow road or passage, I wanted to have the benefit of "shrinking" the width of the side-by-side adapted trailer. It was for these reasons and to obtain the concomitant benefits that I invented and developed the instant invention.

SUMMARY OF THE INVENTION

I have acquired the aforementioned benefits by development of a unique tiltable flatbed trailer which is conventional in most respects save that it is adapted for fixture thereto of a removably fixable drawbar which can be mounted to the trailer at its rear portion so as to allow the bed to rotate rearward or simply tilt up and off the bar, while also being lockable to the forward portion of the trailer for drawage with the (drawing) force exerted along the centerline of the flatbed. Alternatively, the drawbar may be removed from its nominal central fixture and removably fixed along an axis which lies obliquely to the centerline, being at its closer point proximate the rear of the trailer and diverging to its further, set-apart position at the forward portion of the trailer. This, of course, allows the drawing force to be applied along a line which runs the length of the trailer bed from a point proximate a forward corner to a rearward point proximate, but spaced apart, from the centerline.

When two such trailer are postured side-by-side, the two wheeled axles of each are (axially) joined by an axle coupling device which is simply a tubular assembly having an orthogonally planar flange at each end thereof. Each planar flange has a plurality of lug holes radially disposed but inward of the perimeters of each flange. This coupling device is used to join the outer hub of one trailer wheel to the outer hub of the adjacently-postured second trailer wheel. Thereafter, the unattached ends of the converging drawbars are yoked together through the use of a hitch assembly. The hitch assembly consists in a conventional ball and hitch mechanism attached to the end of a short beam. The other end of the short beam bears a trapezoidal bracket, the base of which is disposed outward of the hitch-beam assembly. It is the base of the trapezoidal bracket which is oriented toward the trailer assemblage and to which is contiguously secured, at each side of the trapezoidal bracket, the extremities of the converging trailer drawbars. Thereafter, towage of the assembly can be had by pulling the common drawage hitch which transmits the pulling force through the trapezoidal bracket to the individual, obliquely oriented drawbar and fixture assembly of the individual trailers.

DETAILED DESCRIPTION OF THE PREFERRED EMBODIMENT

The preferred embodiment which is about to be disclosed inculcates a version of my trailer invention possessing a centerline, fixed beam and two oblique beam, straddling the center beam and which diverge from each other in a rear-to-front direction. Since only one of these oblique (side) beams are usable in the side-by-side trailer assemblage, it is readily apparent that a trailer of this type can be constructed with only one side beam. This would, of course, necessitate the selling of left-obliquely drawn and right-obliquely drawn trailers. This is not my intent; and, those of ordinary skill will readily recognize my intention to claim any tiltable flatbed trailer having an oblique, off-the-centerline drawing assembly. I shall now disclose the salient elements of my invention.

Figure 1:
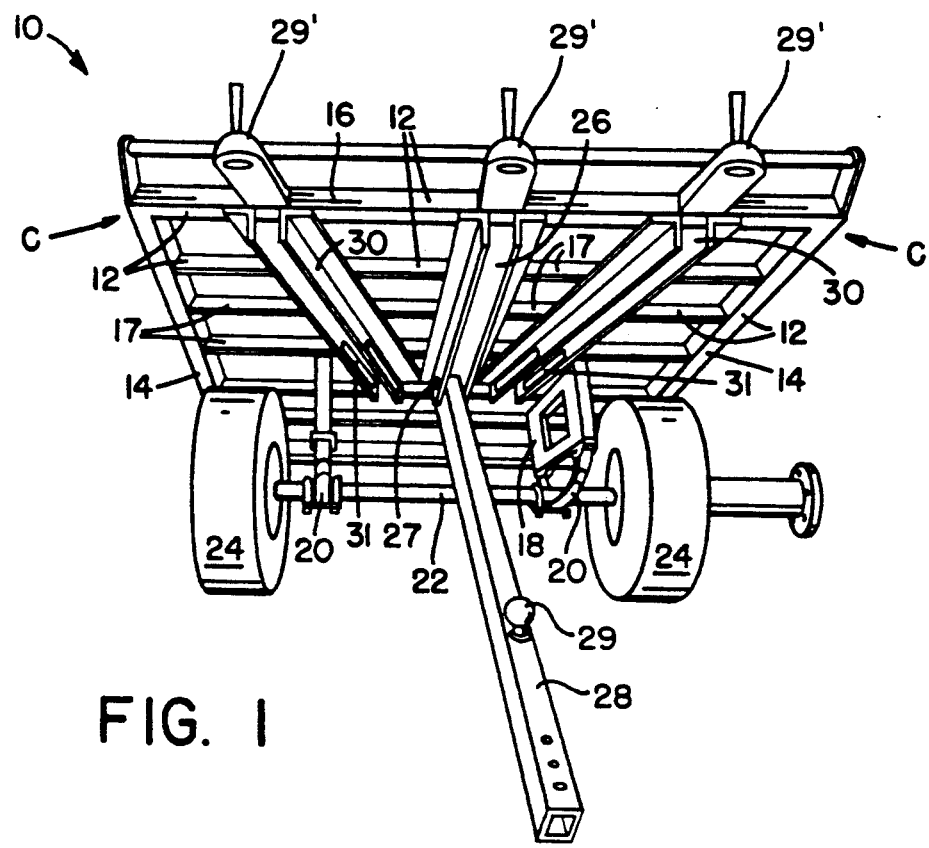
FIG. 1 is a front elevational illustration of the trailer invention in its back-tilted mode.

Referring particularly to FIG. 1, there is shown the invention 10 in a tilt back mode in preparation for use as either a single trailer or a dual, side-by-side assemblage. The most predominant feature is the flatbed framework 12 consisting, at least, of a pair of parallel beams 14 rigidly fixed to a pair of spaced-apart transverse beams 16. Several interior transverse beams 17 are spaced apart within the frame work, and to the rearmost two or three of these interior beams 17 is fixed an axle truck 18. By this truck 18, the bed is journaled on leaf springs 20 to the axle 22. Freely turning wheels 24 are hub mounted to each end of the axle 22. Clearly observable in this illustration is the center beam 26 subtending the frame 12 and rigidly fixed thereto. The center beam 26 has a hole which is bored parallel to the axle 22 at the rearmost portion of the beam. This hole receives therein a pin 27 which couples the distal end of the drawbar 28 pivotally to the center beam 26. A ball 29 is mounted proximally and as shown to the drawbar 28 for removable engagement with the hitch mechanism 29' fixed to the forward extreme end of center beam 26. Two oblique drawbars 30 are seen straddling the center beam 26, subtending and fixedly attached to the frame 12 and diverging from a rearmost fixture, proximate the rearmost portion of the center beam 26, to a rigid fixture proximate the corners "C" of the frame 12. At the proximal ends of the center and oblique beams may be seen a ball hitch 29', each of which may be used to engage the ball 29 attached to the proximal portion of the drawbar 28. Finally, the reader's attention is drawn to the slotted apertures 31, seen in the distal portions of the oblique side beams 30. These apertures 31 allow the distal end of the drawbar to be slidingly and pivotally engaged with the oblique beams 30 by the pin 27. Thus, the reader may readily infer that the drawbar may be disconnected totally from the center beam 26 and attached to an oblique side beam 30 by use of the pivotal, slidable engagement means 27,31 and the ball and hitch mechanism 29, 29'. As it appears in this illustration (FIG. 1), the oblique, diverging side beams are mirror images of each other about the plane passing vertically and longitudinally through the center beam 26.

Figure 2:
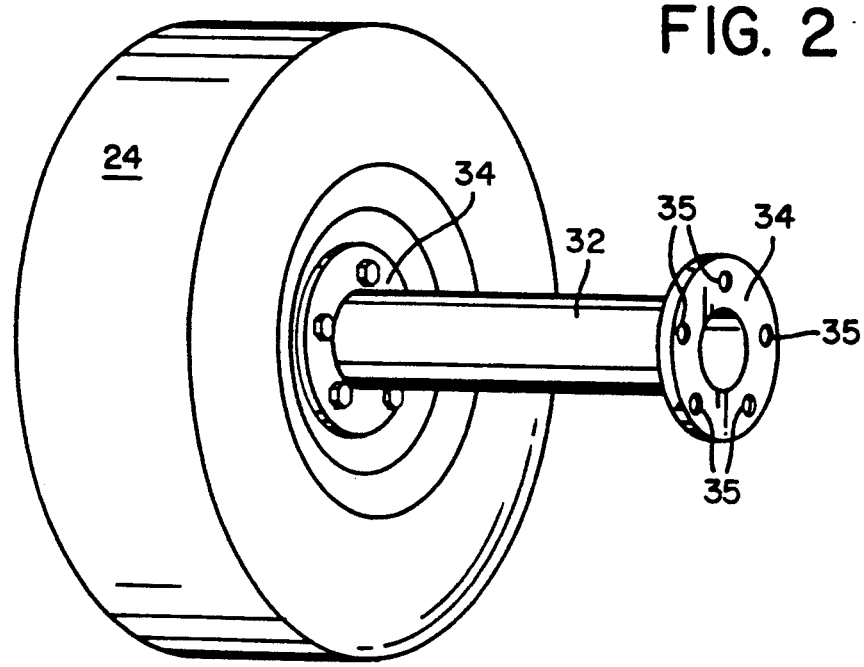
FIG. 2 is an illustration of a common axle connector disposed on one wheel hub of the FIG. 1 trailer assembly.

Apparent in FIG. 1, and more detailed FIG. 2, is the axle extender or coupling means 32. This tubular axle extension means is flanged 34 at both ends. Through a plurality of lug holes 35 arranged axially thereabout each flange, the hubs of the two wheels 24 that are adjacent each other (in a trailer side-by-side configuration) may be joined, one to the other. This is the first necessary coupling of my invention.

Figure 3:
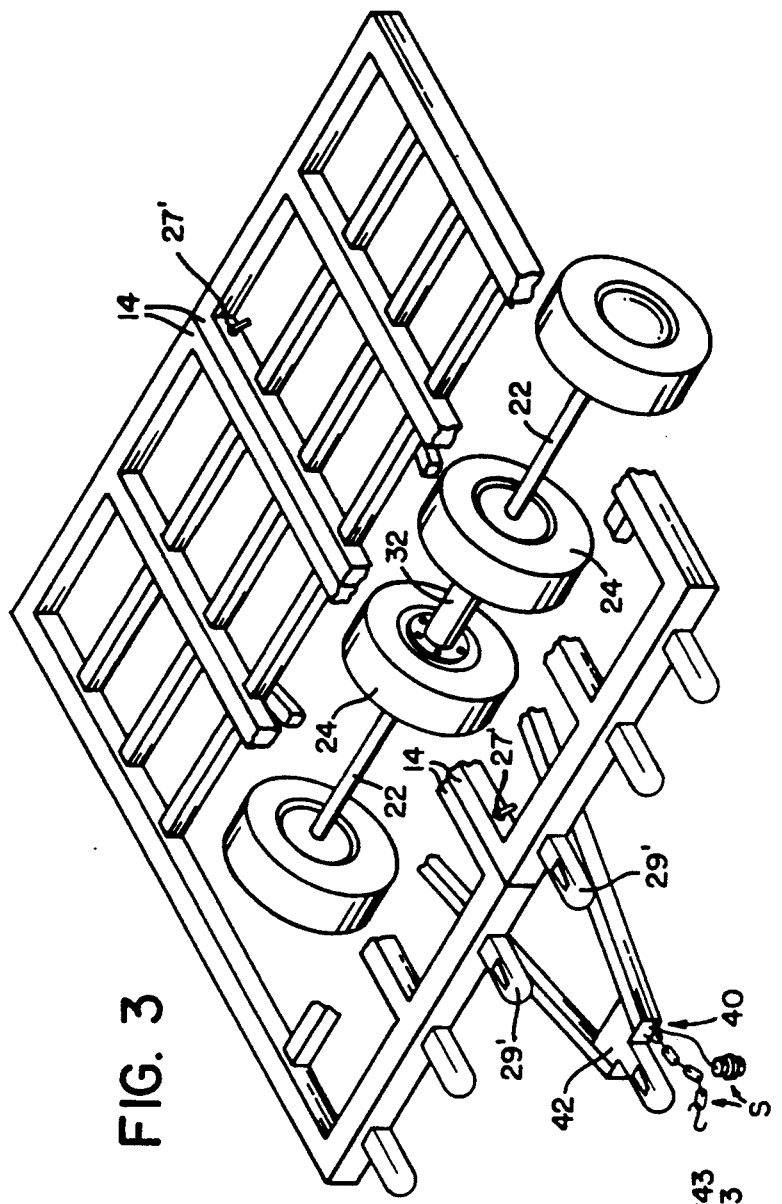
FIG. 3 is a isometric illustration of the invention dual-trailer assembly in operational configuration as seen from the front and slightly above the assembly with a central cut-away portion disclosing the axle coupling feature.

Turning now to FIG. 3, an isometric depiction of a side-by-side trailer coupling is shown with the second salient coupling 40 shown in the foreground. During the set-up for axially coupling, the drawbars of the individual trailers are removed from the center beam position and mounted to the oblique side beams of each trailer in the manner shown so that the drawbars converge to the second coupling mechanism 40. As mentioned earlier, the distal ends of the drawbars are pin-engaged with the slotted apertures of the right and left oblique beams 30 of the left and right trailers respectively. The trailers are then tilted forward so that the hitches 29' of the trailers connect with the balls 29 of the several drawbars. In this manner, the drawbars converge to a second coupling 40, as previously mentioned, and the bar-coupling hitch assembly 42 is made ready for joinder to a towing vehicle. The reader will note herein that I have made no digression to matters such as wiring and safety harnessing (S, in the drawings). These attributes, of any roadworthy trailer, are well-known by those of ordinary skill and their presence in the instant invention is tacitly apparent as the appendages attached to and depending from the common drawage hitch 42.

Figure 4:
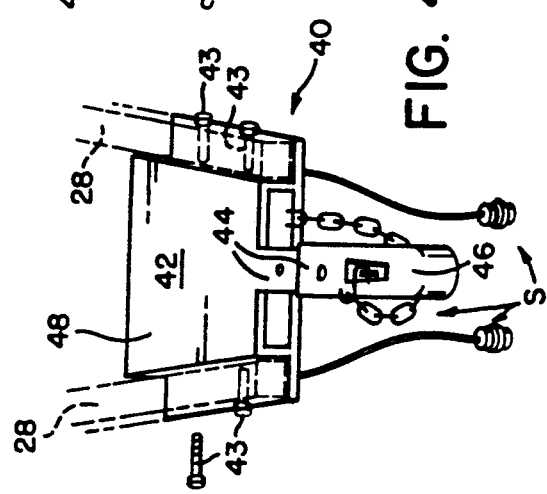
FIG. 4 is an illustration of the common drawage hitch as seen in front of, and above, the device with phantom drawbar attachment.

An important facet of this invention lies in the common drawage hitch 42 which is illustrated in FIG. 4. It consists in a short, adjustable beam 44 which has a conventional hitch 46 mechanism at the proximal end (relative the figure) and a trapezoidal bracket 48 at the distal end thereof. The trapezoidal bracket is used, preferably, because great strength can be acquired therewith; but those of ordinary skill will readily recognize the fact that any triangular figure or essentially triangular-shaped figure may be used for the bracket in lieu of the trapezoidal one shown herein. Further reference to FIG. 4 discloses, in phantom, the extreme end (proximal) of the drawbars 28 in the side-by-side trailer arrangement of FIG. 3. The ends of these drawbars may be bolted 43 or otherwise conventionally secured (contiguously) to the sides of the trapezoidal bracket 48.

As further securement to the trailer configuration of FIG. 3, I recommend that link pins 27' be inserted along the conterminous margin beams 14 of the two trailers. This again is a technique well known to those of ordinary skill and I see no reason to digress nor dwell further on the subject. Those familiar with the art may conceive many innovational improvements and such tasks are readily commended to them consistent with the hereinafter appended claims.

What is claimed is:

1. In a tiltable flatbed sport vehicle transport trailer, the improved assembly for side-by-side coupling of two said trailers in order to acquire a common axle and a common drawage point, said assembly comprising:
   a common drawage hitch in the form of a yoke for coupling thereto a pair of trailer drawbars;
   an axle extender for coupling at least one axle of a first said trailer to an axle of an adjacent second said trailer, the extender comprising a tube flanged at each end thereof with the flanges having therein a plurality of lug holes;
   two said trailers each of which comprises a tiltable flatbed frame mounted to a two-wheeled axle and having a rectangular shape with defined forward and rearward portions, to be towed in a forward direction and also tilted arcuately in a rearward direction on said axle, the frame subtending a center beam extending fixedly thereto along a forward-rearward centerline, the frame further subtending a left and a right beam, each separately and fixedly disposed to the frame on either side of the center beam and diverging angularly from a rearward, proximate-the-center beam position to a forward, distal-the-center beam position, the center, left and right beams each bearing a conventional hitch means respectively at a forward extreme thereof, the center beam having a hole therein proximate a rearward extreme thereof, the left and right diverging beams having slotted apertures proximate their rearward extremes; and
   a trailer drawbar for each said trailer, the drawbar used for engagement with any of the left, center or right beams and for drawing said trailer, the drawbar having a rearwardly positioned bore for placement therein of a pin means to pivotally engage the center beam at said bore or pivotally and slidably engage the left or the right beams at said slotted apertures, the drawbar further having a fixed ball at a position to engage the left, center or right beam hitches when a hole of the drawbar is pinned through the center beam bore or left or right beam apertures, the drawbar including connection means at a forward extreme thereof for attachment to the common draw hitch, whereby a coupling of a first trailer to a second in side-by-side alignment with a joinment of individual axles by an axle extender, a right beam drawbar ball and hitch connection for the first and a similar but left beam connection for the second trailer and a drawbar-to-common draw hitch coupling at the forward extremes of the left and right drawbars effects said assembly.

* * * * *